US007079495B1

(12) United States Patent
Pearce et al.

(10) Patent No.: US 7,079,495 B1
(45) Date of Patent: Jul. 18, 2006

(54) SYSTEM AND METHOD FOR ENABLING MULTICAST TELECOMMUNICATIONS

(75) Inventors: Christopher E. Pearce, Dallas, TX (US); Delon R. Whetten, Allen, TX (US); Larry G. Michalewicz, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,298

(22) Filed: Jan. 4, 2000

(51) Int. Cl.
*H04L 12/16* (2006.01)

(52) U.S. Cl. .................. 370/260; 370/252; 370/390; 370/401; 370/432; 340/3.52; 379/88.17; 379/202.01; 455/416; 455/503; 709/204.227

(58) Field of Classification Search .............. 370/260, 370/261, 262, 352, 390, 392, 401, 432, 466; 709/204, 204.277; 340/3.52; 379/88.17; 455/416
See application file for complete search history.

(56) References Cited

U.S. PATENT DOCUMENTS

| 4,631,534 | A | 12/1986 | Franklin et al. |
| 5,033,079 | A | 7/1991 | Catron et al. ............... 379/100 |
| 5,058,110 | A | 10/1991 | Beach et al. |
| 5,093,827 | A | 3/1992 | Franklin et al. |
| 5,375,167 | A | 12/1994 | Bales et al. |
| 5,420,852 | A | 5/1995 | Anderson et al. |
| 5,455,855 | A | 10/1995 | Hokari ........................ 379/229 |
| 5,471,318 | A | 11/1995 | Ahuja et al. |
| 5,559,883 | A | 9/1996 | Williams |
| 5,610,910 | A | 3/1997 | Focsaneanu et al. ......... 370/351 |
| 5,623,488 | A | 4/1997 | Svennevik et al. |
| 5,623,601 | A | 4/1997 | Vu ........................ 395/187.01 |
| 5,636,371 | A | 6/1997 | Yu .............................. 395/500 |
| 5,640,446 | A | 6/1997 | Everett et al. |
| 5,692,039 | A | 11/1997 | Brankley et al. ............ 379/229 |
| 5,710,591 | A * | 1/1998 | Bruno et al. .............. 348/14.09 |
| 5,748,736 | A * | 5/1998 | Mittra |
| 5,778,174 | A | 7/1998 | Cain ...................... 395/187.01 |
| 5,781,550 | A | 7/1998 | Templin et al. |
| 5,802,058 | A | 9/1998 | Harris et al. |
| 5,803,199 | A | 9/1998 | Walter |
| 5,805,803 | A | 9/1998 | Birrell et al. ........... 395/187.01 |
| 5,826,014 | A | 10/1998 | Coley et al. ........... 395/187.01 |
| 5,835,718 | A | 11/1998 | Blewett ................. 395/200.48 |
| 5,857,191 | A | 1/1999 | Blackwell, Jr. et al. ....... 707/10 |
| 5,867,494 | A | 2/1999 | Krishnaswamy et al. |
| 5,867,495 | A | 2/1999 | Elliott et al. |
| 5,872,779 | A | 2/1999 | Vaudreuil |
| 5,884,025 | A | 3/1999 | Baehr et al. |

(Continued)

OTHER PUBLICATIONS

Cisco Systems, Inc.; "System Description for the Cisco Communications Network Version 2.1;" Cisco Communications Network; all, 1997.

*Primary Examiner*—Alpus H. Hsu
*Assistant Examiner*—Steven Blount
(74) *Attorney, Agent, or Firm*—Baker Botts L.L.P.

(57) ABSTRACT

A communication network is provided that includes a unicast telephony device, and a plurality of multicast telephony devices operable to receive multicast media streaming transmitted to a multicast group address. The communication network further includes a multicast intermediary operable to receive multicast media streaming sent to the multicast group address. The multicast intermediary is further operable to communicate the media streaming to the unicast telephony device to enable the unicast telephony device to participate in the multicast communication with the multicast telephony devices.

41 Claims, 4 Drawing Sheets

U.S. PATENT DOCUMENTS

| | | | |
|---|---|---|---|
| 5,896,379 A | 4/1999 | Haber | |
| 5,940,479 A | 8/1999 | Guy et al. | |
| 5,963,547 A * | 10/1999 | O'Neil | |
| 5,983,005 A | 11/1999 | Monteiro et al. | |
| 6,006,272 A | 12/1999 | Aravamudan et al. | |
| 6,018,766 A | 1/2000 | Samuel et al. | |
| 6,020,916 A * | 2/2000 | Gerszberg et al. | 348/14.07 |
| 6,138,144 A * | 10/2000 | DeSimone et al. | 709/204 |
| 6,151,679 A | 11/2000 | Friedman et al. | |
| 6,154,839 A | 11/2000 | Arrow et al. | 713/154 |
| 6,163,810 A * | 12/2000 | Bhagavath et al. | |
| 6,173,314 B1 * | 1/2001 | Kurashima et al. | 709/204 |
| 6,175,618 B1 | 1/2001 | Shah et al. | 379/201 |
| 6,175,867 B1 | 1/2001 | Taghadoss | 709/223 |
| 6,181,697 B1 * | 1/2001 | Nurenberg et al. | |
| 6,212,550 B1 | 4/2001 | Segur | |
| 6,226,373 B1 | 5/2001 | Zhu et al. | |
| 6,259,701 B1 * | 7/2001 | Shur et al. | |
| 6,321,336 B1 | 11/2001 | Applegate et al. | 713/201 |
| 6,360,265 B1 | 3/2002 | Falck et al. | |
| 6,363,411 B1 | 3/2002 | Dugan et al. | 709/202 |
| 6,363,424 B1 | 3/2002 | Douglas et al. | 709/224 |
| 6,374,298 B1 | 4/2002 | Tanno | 709/227 |
| 6,385,193 B1 | 5/2002 | Civanlar et al. | |
| 6,389,130 B1 | 5/2002 | Shenoda et al. | |
| 6,389,462 B1 | 5/2002 | Cohen et al. | 709/218 |
| 6,400,804 B1 * | 6/2002 | Bilder | 379/76 |
| 6,404,745 B1 | 6/2002 | O'Neil et al. | |
| 6,404,746 B1 | 6/2002 | Cave et al. | |
| 6,404,764 B1 | 6/2002 | Jones et al. | 370/352 |
| 6,418,138 B1 | 7/2002 | Cerf et al. | |
| 6,421,437 B1 | 7/2002 | Slutsman | 379/201.02 |
| 6,430,176 B1 | 8/2002 | Christie, IV | |
| 6,446,127 B1 | 9/2002 | Schuster et al. | |
| 6,449,269 B1 | 9/2002 | Edholm | |
| 6,456,615 B1 | 9/2002 | Kikinis | |
| 6,477,169 B1 * | 11/2002 | Angle et al. | |
| 6,480,594 B1 | 11/2002 | Van Tol | |
| 6,487,196 B1 | 11/2002 | Verthein et al. | 370/352 |
| 6,512,818 B1 | 1/2003 | Donovan et al. | 379/88.18 |
| 6,529,514 B1 | 3/2003 | Christie et al. | |
| 6,567,851 B1 * | 5/2003 | Kobayashi | 709/228 |
| 6,584,562 B1 | 6/2003 | Fiori | 713/151 |
| 6,603,849 B1 | 8/2003 | Lin et al. | 379/221.01 |
| 6,608,825 B1 | 8/2003 | Luddy | 370/342 |
| 6,614,784 B1 | 9/2003 | Glitho et al. | 370/352 |
| 6,678,279 B1 * | 1/2004 | Meredith et al. | 370/413 |

* cited by examiner

SYSTEM AND METHOD FOR ENABLING MULTICAST TELECOMMUNICATIONS

CROSS-REFERENCE TO RELATED APPLICATIONS

This application is filed concurrently with the following commonly-owned applications:

SYSTEM AND METHOD FOR PROVIDING SECURITY IN A TELECOMMUNICATION NETWORK, Ser. No. 09/477,193;

SYSTEM AND METHOD FOR MAINTAINING A COMMUNICATION LINK, Ser. No. 09/477,192; and SYSTEM AND METHOD FOR A VIRTUAL TELEPHONY INTERMEDIARY, Ser. No. 09/477,297.

TECHNICAL FIELD OF THE INVENTION

This invention relates generally to the field of telecommunications, and more specifically to a system and method for enabling multicast telecommunications.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data for transmission over an IP network. Although integrating telecommunications into existing data networks provides many advantages, this integration does create additional network traffic which can create problems in networks with insufficient bandwidth.

SUMMARY OF THE INVENTION

In accordance with the present invention, a system and method for enabling multicast telecommunications is provided that substantially eliminates or reduces disadvantages or problems associated with previously developed systems and methods. In particular, the present invention contemplates an apparatus and method for coupling unicast telephony devices and multicast telephony devices. The present invention enables multicast telephony devices to communicate with each other using multicast streaming while still allowing unicast telephony devices to participate.

In one embodiment of the present invention, a method is provided for enabling a multicast telecommunication session. The method includes receiving multicast media streaming sent to a multicast group address at a multicast intermediary. The method further includes communicating the media streaming to a unicast telephony device to enable the unicast telephony device to participate in a multicast telecommunication session.

In another embodiment of the present invention, a communication network is provided that includes a unicast telephony device, and a plurality of multicast telephony devices operable to receive multicast media streaming transmitted to a multicast group address. The communication network further includes a multicast intermediary operable to receive multicast media streaming sent to the multicast group address. The multicast intermediary is further operable to communicate the media streaming to the unicast telephony device to enable the unicast telephony device to participate in the multicast communication with the multicast telephony devices.

Technical advantages of the present invention include a system and method that allow unicast telephony devices to effectively participate in a telecommunication session with multicast telephony devices. Using a multicast intermediary to act on behalf of the unicast telephony devices, the multicast telephony devices and the multicast intermediary are able to communicate using multicast. The multicast intermediary uses unicast to forward all multicast streaming from the multicast telephony devices to the unicast telephony devices. In this manner, multicast telephony devices are able to take advantage of the multicast feature, while still being able to communicate with the unicast telephony devices, which reduces network traffic and saves network bandwidth.

Useful applications of the present invention include client summing multicast conferences between unicast and multicast devices, music on hold transmitted to multicast and unicast devices, and silent monitoring of multicast calls by one or more unicast devices. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
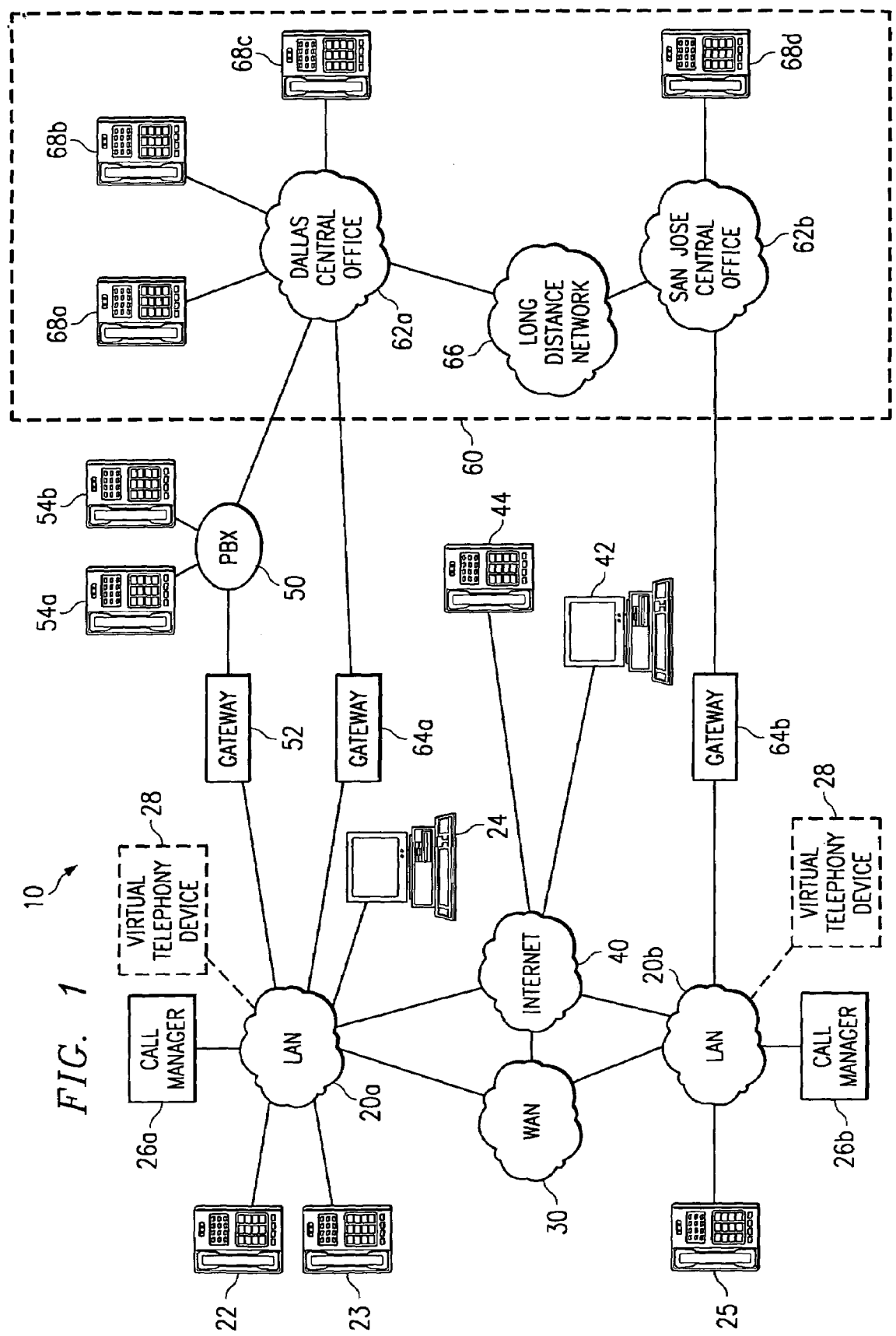
FIG. 1 illustrates an exemplary communication network in accordance with the present invention.

FIG. 1 illustrates an exemplary communication network 10. In the illustrated embodiment, communication network 10 includes a plurality of local area networks (LANs) 20 interconnected using a wide area network (WAN) 30. Each LAN 20 is a computer data network that is further operable to transmit audio and/or video (media) telecommunication signals. In the particular embodiment illustrated in FIG. 1, LANs 20 are Internet Protocol (IP) networks. However, LANs 20 may be any type of network that allows the transmission of media telecommunications, as well as traditional data communications. Therefore, although subsequent description will primarily focus on IP telephony devices, it should be understood that other appropriate telephony devices, such as Voice over Frame Relay devices, are also included within the scope of this description. Furthermore, although a specific communication network is illustrated in FIG. 1, the term "communication network" should be interpreted as generically defining any network capable of transmitting telecommunication signals, data, and other types of signals and messages.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateways. For example, LAN 20a is coupled to a private branch exchange (PBX) 50 through a gateway 52. PBX 50 represents the analog and/or digital telephone systems typically used by businesses. PBX 50 includes a plurality of extension telephones (or subscriber sets) 54a and 54b to which PBX 50 directs incoming telephone calls. Gateway 52 may be either an analog or a digital gateway depending on the type of PBX 50 to which it is coupled. The operation of the gateways in communication network 10 is described in further detail below.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunication equipment that are located across the country. For example, central offices (COs) 62 connect telephone customers, such as residences and businesses, to PSTN 60. In the illustrated embodiment, LANs 20 are coupled to selected central offices 62 through the use of gateways 64, described below. Central offices 62 are coupled through a long distance network 66 that allows communication between residences and businesses coupled to central offices 62 in different areas, such as CO 62a in Dallas or CO 62b in San Jose.

IP networks transmit data (including voice and video data) by placing the data in packets and sending each packet to the selected destination. The technology that allows telecommunications to be transmitted over an IP network may be referred to as Voice over IP (VoIP). IP telephony devices 22–24 are coupled to LAN 20a to allow such communication over LAN 20a. IP telephony devices 22–24 have the capability of encapsulating a user's voice (or other media inputs) into IP packets so that the media can be transmitted over LAN 20a, WAN 30 and/or Internet 40. IP telephony devices may include telephones, fax machines, computers running telephony software (such as MICROSOFT NETMEETING), analog or digital gateways, or any other device capable of performing telephony functions using an IP network.

An IP telephony device may resemble a traditional digital PBX telephony device, but instead of connecting to a proprietary PBX port, the telephony device plugs into a LAN jack, such as an Ethernet jack. Alternatively, a user may plug a handset or headset directly into a personal computer 24 on LAN 20 to form a virtual IP telephony device. An IP telephony device operates as a standard IP network device and typically has its own IP address (which may be assigned dynamically). IP telephony devices may have the ability to handle data coding and decoding at the telephony device. This feature allows the telephony device to switch audio encoding schemes on demand, such as switching between G.711 and G.723 encoding.

A call manager 26a controls IP telephony devices 22–24 (a similar call manager 26b may be located on LAN 20b). Call manager 26a is an application that controls call processing, routing, telephone features and options (such as call hold, call transfer and caller ID), device configuration, and other telephony functions and parameters within communication network 10. Call manager 26a can control all of the IP telephony devices on LAN 20a, and it may also control IP telephony devices located across WAN 30. For example, call manager 26a is capable of controlling telephony devices on LAN 20b. Thus, call manager 26b may be eliminated entirely or used as a redundant controller.

When a user wishes to place a call from one IP telephony device on LAN 20a to another IP telephony device on LAN 20a (an intra-LAN call), the originating telephony device transmits a signal to call manager 26a indicating the desired function and the telephony device to be called. Call manager 26a then checks on the availability of the target telephony device and, if available, sets up the call by instructing the originating telephony device to establish a media stream with the target telephony device. The initial signaling between call manager 26a and either the originating telephony device or the target telephony device is transmitted over LAN 20a (and, if necessary, WAN 30) using a communication protocol, such as the Transmission Control Protocol (TCP).

The TCP layer in the transmitting telephony device divides the data to be transmitted into one or more packets, numbers the packets, and then forwards them to the IP network layer for transmission to the destination telephony device. Although each packet has the same destination IP address, the packets may travel along different paths to reach the intended destination. As the packets reach the destination telephony device, the TCP layer in the destination telephony device reassembles the individual packets and ensures that they all have arrived. Once TCP reassembles the data, the protocol forwards the data to the appropriate application or other software module in the destination telephony device as a single message.

After call manager 26a initiates the call with signaling over TCP, a codec (coder/decoder) converts the voice, video or fax signals generated by the users of the telephony devices from analog voice signals into digital form. The codec may be implemented either in software or as special-purpose hardware in IP telephony devices 22–24. In the case of an IP telephone, as the user speaks into the handset, the codec converts the analog voice signals into digital data. The digitally encoded data is then encapsulated into IP packets so that it can be transmitted over LAN 20a.

This encapsulation may be performed by Real-Time Transport Protocol (RTP) running over User Datagram Protocol (UDP), or any other suitable communication protocols. As with TCP, UDP uses the Internet Protocol to get data packets from one device to another. Unlike TCP, however, UDP does not provide sequencing and error-checking of the arriving packets. However, since UDP does not perform these functions, UDP operates faster than TCP and is useful when speed is more important than accuracy. This is true of media streaming since it is critical that the data be transmitted as quickly as possible, but it is not critical that every single packet is reassembled correctly (either its absence is negligible or its content can be extrapolated by the destination telephony device). Once UDP has received and reassembled the IP packets at the destination telephony device, a codec in the destination telephony device translates the digital data into analog audio and/or video signals for presentation to the user. The entire process is repeated each time that any call participant (or any other source) generates an audio, video, or fax signal.

In addition to intra-LAN calls, calls can also be placed to and received from non-IP telephony devices 54, 68 that are connected to PBX 50 or PSTN 60. Such calls are made through a gateway 52, 64. Because gateway 52 performs similarly to gateways 64, only gateways 64 will be discussed in further detail. Each gateway 64 converts analog or digital circuit-switched data transmitted by PSTN 60 to packetized data transmitted by LAN 20, and vice-versa. When media packets are transmitted from LAN 20, gateway 64 retrieves the data contained in the incoming packets and converts this digital data to the analog or digital format used by the PSTN trunk to which gateway 64 is coupled. Since the digital format for voice transmissions over an IP network is often different than the format used on the digital trunks of PSTN 60, gateway 64 provides a conversion between these different digital formats, referred to as transcoding. Gateway 64 also translates between the VoIP call control system and the Signaling System 7 (SS7) protocol or other signaling protocols used in PSTN 60.

For voice transmissions from PSTN 60 to LAN 20, the process is reversed. Gateway 64 takes the incoming voice transmission (in either analog or digital form) and converts it into the digital format used by LAN 20. The digital data is then encapsulated into IP packets and transmitted over LAN 20.

When placing a call to a PSTN telephony device 68 from IP telephony device 22 on LAN 20a, the voice or fax signal generated by the user of IP telephony device 22 is digitized and encapsulated, as described above. The packets are then transmitted over LAN 20a to gateway 64. If more than one PSTN gateway 64 is coupled to LAN 20a, call manager 26a determines which gateway 64 is to receive the transmission based on the telephone number (e.g., the North American Numbering Plan (NANP) number) of the PSTN telephony device. Gateway 64 retrieves the IP packets and converts the data to the format (either digital or analog) used by the PSTN trunk to which the gateway is connected. The voice signals are then sent to PSTN telephony device 68 over PSTN 60. This process, and the reverse process, is continued between PSTN 60 and LAN 20a through gateway 64 until the call is complete.

Calls can also be made between an IP telephony device located on a LAN 20 and another IP telephony device located on another LAN 20, across WAN 30, or on Internet 40. For example, a call may be placed between IP telephony device 22 connected to LAN 20a and IP telephony device 25 connected to LAN 20b. As discussed above, the analog voice or fax data is digitized and encapsulated into IP packets at the originating IP telephony device 22. However, unlike communications with telephony devices on PSTN 60, gateway 64 is not needed to convert the IP packets to another format. Instead, a router (or other similar device) directs the packets to the IP address of target IP telephony device 25. IP telephony device 25 then retrieves the data and coverts it to analog form for presentation to the user. Either call manager 26a or call manger 26b (on LAN 20b) may control IP telephony device 25.

When a call is placed to an IP telephony device, for example IP telephony device 22, a call initiation request is first sent to call manager 26a. If the originating telephony device is an IP telephony device (e.g., an intra-LAN or inter-LAN IP call), the originating IP telephony device generates the call initiation request and sends the request to call manager 26a. If the originating telephony device is a non-IP telephony device, such as PSTN telephony device 68, gateway 64a first receives the incoming call from CO 62a, and sends a call initiation request to call manager 26a indicating the IP telephony device that is being called. In either case, once call manager 26a receives the call initiation request, call manager 26a sends a signal to IP telephony device 22 offering the call to the telephony device.

If IP telephony device 22 can accept the call (e.g., it is not in use or under a Do Not Disturb instruction from the user), IP telephony device 22 replies to call manager 26a that it will accept the call. Upon receiving this acceptance, call manager 26a transmits a signal to IP telephony device 22 to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise indicating that the telephony device is ready to receive the incoming call. For the purposes of this application, the term "off-hook" is used to generically indicate a condition of a telephony device when it is ready to initiate or receive telecommunication signals.

Once IP telephony device 22 has been taken off-hook, call manager 26a instructs IP telephony device 22 and the originating telephony device to begin media streaming to each other. If the originating telephony device is a non-IP telephony device, such as PSTN telephony device 68, this media streaming occurs between IP telephony device 22 and gateway 64. Gateway 64 then transmits the media to PSTN telephony device 68.

One advantage associated with IP telephony devices is their ability to communicate and interact with any other IP device coupled to the IP network. For example, IP telephony devices may interact and communicate with other IP telephony devices, with non-IP telephony devices, and even with virtual telephony devices. A virtual telephony device may be implemented as software, firmware and/or hardware in order to interact with other devices in communication network 10. Virtual telephony devices may be implemented as software or firmware on any existing or dedicated device on the IP network. For example, call manager 26a may contain software for implementing one or more virtual telephony devices 28. Virtual telephony device software or firmware may also be located on any other network device. The computer or other device on which virtual telephony software is located includes a network interface, a computer-readable medium to store the software, and a processor to execute the software.

Virtual telephony devices may be logically inserted between two or more IP telephony devices to act as an intermediary between the two telephony devices. Once such a relationship is set up, signaling and media streaming that passes through the virtual telephony device may then be modified through address translation or data stream manipulation for various reasons before they are sent on to the destination device. Reasons for such modifications include providing network security, duplicating streams, dynamically redirecting streams, maintaining connections between devices, converting between data formats (e.g., A-Law to µ-Law), and injecting media.

As will be described below, one implementation of virtual telephony device 28 is as a multicast intermediary that serves as an intermediary between one or more unicast telephony devices and one or more multicast telephony devices to enable multicast telephony devices to communicate with each other using multicast streaming, while still allowing unicast telephony devices to participate in the telecommunication session.

In order for a telecommunication session to be established through a virtual telephony device (e.g., a call placed to IP telephony device 22 in LAN 20 through virtual telephony device 28) telephony device 22 first registers with virtual telephony device 28. Call manager 26*a* instructs telephony device 22 to register with virtual telephony device 28 at a specified IP address and port. Telephony device 22 signals virtual telephony device 28 via TCP/IP indicating that it would like to register. If virtual telephony device 28 accepts the registration request, telephony device 22 sends a registration message to virtual telephony device 28 using UDP/IP (or any other appropriate transmission protocol). The registration message typically comprises information about the telephony device such as the telephony device's IP and media access control (MAC) addresses, the type and capabilities of the telephony device, and the codec(s) used by the telephony device.

Figure 2:
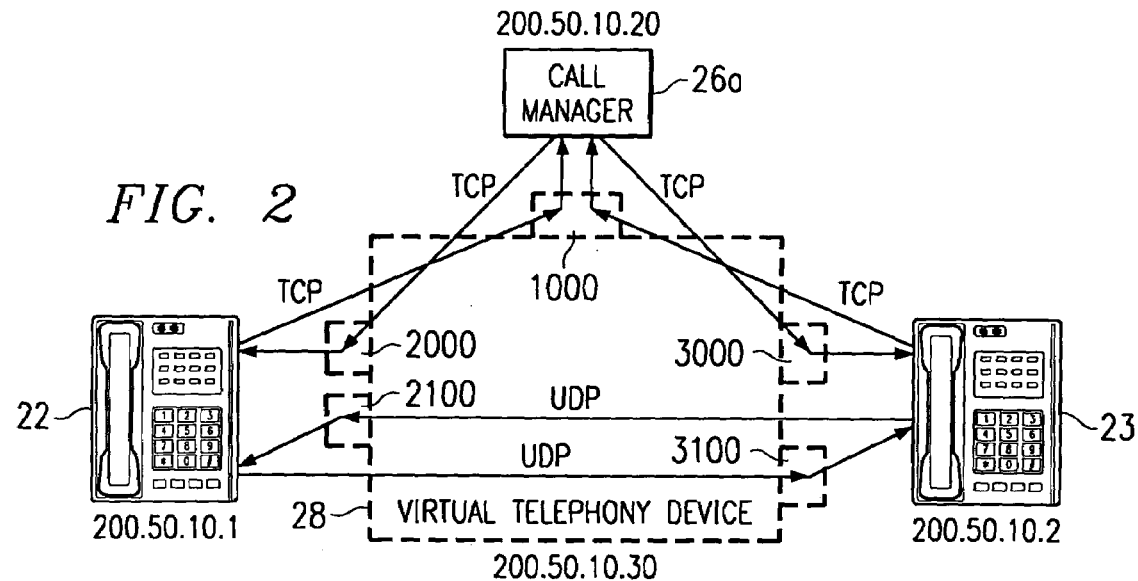
FIG. 2 illustrates an exemplary communication link between network devices using a virtual telephony device.

FIG. 2 illustrates an exemplary communication link created using virtual telephony device 28. It should be noted that although the TCP and UDP protocols are specifically identified in the following discussion, any other suitable signaling and media transmission protocols may be used. Virtual telephony device 28 initiates this communication link by first creating a logical connection to telephony device 22. Creating this logical connection involves associating logical UDP and/or TCP ports of virtual telephony device 28 with telephony device 22. Virtual telephony device 28 designates one of its TCP ports (for example, port 2000) as the signaling port of telephony device 22, and designates one of its UDP ports (for example, port 2100) as the streaming port for telephony device 22. Virtual telephony device 28 may instruct call manager 26*a* to send all signaling directed to telephony device 22 to logical port 2000 of virtual telephony device 28. Likewise, virtual telephony device 28 may instruct call manager 26*a* to send all media streaming directed to telephony device 22 from other telephony devices to logical port 2100 of virtual telephony device 28. Virtual telephony device 28 will automatically forward any data that is subsequently sent to these ports to telephony device 22.

In order to create a communication link between telephony devices 22 and 23, a logical connection is also made to telephony device 23. For example, telephony device 23 may be assigned a logical TCP port of 3000 and a logical UDP port of 3100 of virtual telephony device 28. Likewise, virtual telephony device 28 may also designate a TCP port (for example, port 1000) as the signaling port of call manager 26*a* (data is typically not streamed using RTP to and from call manager 26, so a UDP port is usually not required). Virtual telephony device 28 may then instruct telephony devices 22 and 23 (as well as any other registered telephony devices) to send all signaling directed to call manager 26*a* to logical port 1000 of virtual telephony device 28. In this manner, UDP streaming between telephony devices 22 and 23, as well as TCP signaling between the telephony devices and call manager 26, can be transmitted via virtual telephony device 28.

Figure 3:
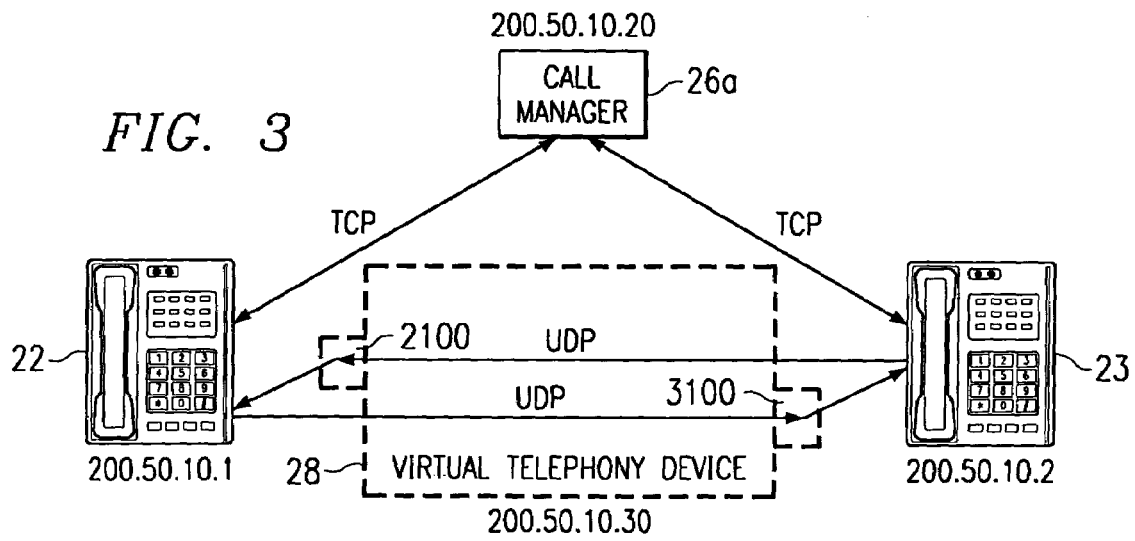
FIG. 3 illustrates another exemplary communication link between network devices using a virtual telephony device.

FIG. 3 illustrates an alternative communication link between telephony devices 22 and 23. Although FIG. 2 shows the TCP signaling between IP telephony devices and call manager 26*a* being directed through virtual telephony device 28, this signaling may also be directly transmitted between call manager 26*a* and telephony devices 22 and 23. In this case, virtual telephony device 28 is used only as an intermediary through which RTP streams between telephony devices 22 and 23 are sent using logical UDP ports 2100 and 3100.

The communication links illustrated in FIGS. 2 and 3 are used to enable a call between telephony devices 22 and 23 as follows. Telephony device 23 initially sends a call initiation request via TCP to call manager 26*a* indicating a desire to communicate with telephony device 22. Call manager 26*a* then sends signaling information via TCP to telephony device 22 indicating the incoming call from telephony device 23. This TCP signaling between telephony device 23 and call manager 26*a* may be passed through virtual telephony device 28, as illustrated in FIG. 2, or it may be directly transmitted between telephony device 23 and call manager 26*a*, as shown in FIG. 3. If telephony device 22 accepts the call, call manager 26*a* establishes media streaming between telephony devices 22 and 23 by signaling telephony device 23 to begin streaming media to port 2100 of virtual telephony device 28 (at IP address 200.50.10.30, for example).

When media packets are received at port 2100, virtual telephony device 28 examines the packets and notes the source address of the data. This source address is the IP address of telephony device 23, for example, 200.50.10.2, and a particular logical port of the IP address. Since telephony device 23 has registered with virtual telephony device 28, virtual telephony device 28 then modifies the source address and port in the header of the IP packets coming from telephony device 23 to the IP address and logical UDP port of virtual telephony device 28 that have been associated with telephony device 23 (200.50.10.30, port 3100). Virtual telephony device 28 then forwards the packets to telephony device 22. Since the header of each packet indicates that the data stream originated from port 3100 of virtual telephony device 28, it appears to telephony device 22 that telephony device 23 is actually located at this address and port.

A similar process is performed when telephony device 22 returns a media stream in response to the media stream from telephony device 23. Since telephony device 22 believes that telephony device 23 is located at port 3100 of virtual telephony device 28, telephony device 22 directs its data streaming to this location. When virtual telephony device 28 receives the IP packets at port 3100, virtual telephony device 28 modifies the source IP address and port in the packets' header from the source port and IP address (200.50.10.1) of telephony device 22 to port 2100 of virtual telephony device 28. Virtual telephony device 28 then forwards the packets to telephony device 23 since the packets were received at port 3100. Since the header of each packet indicates that the data stream originated from port 2100 of virtual telephony device 28, it appears to telephony device 23 that telephony device 22 is actually located at this address and port. All subsequent RTP streams sent between telephony devices 22 and 23 are similarly passed through and modified by virtual telephony device 28.

Since all data that is sent between two or more IP telephony devices may be passed through virtual telephony device 28, virtual telephony device 28 can be used for other functions in addition to the address translation function described above. Such uses include serving as an intermediary to enable fully functional communication between telephony devices that use different types of call or control signaling, data compression formats, sizes of data payloads, audio/video sampling lengths, or any other communication parameters that are different between the telephony devices. One such use of virtual telephony device 28 is as a multicast intermediary between one or more unicast telephony devices and one or more multicast telephony devices.

There are three basic ways to transmit identical data to multiple receivers on a packet-based network: broadcast, unicast, and multicast. A broadcast is a single data stream sent from a single device to every device on a network (or subnet). When forwarding a broadcast, routers and switches have no way to determine whether devices on a particular network actually need or want the data, and a good deal of bandwidth may be used unnecessarily.

To avoid sending unwanted messages to devices, a source device alternatively can transmit a unicast to each intended destination device. Each unicast is an individual data stream sent to the particular destination device. Unlike broadcast, the data stream is not forwarded to unintended recipients. However, a separate, but identical, data stream must be generated for each destination device. This is inefficient and consumes network bandwidth. In addition, extra processing power and memory is required at the source device to generate a message for each destination device.

The third option is to send a multicast. A multicast is a single data stream that is intended only for particular devices that have joined an appropriate "multicast group." Like a broadcast, the source device generates a single data stream. Unlike a broadcast, however, a multicast-enabled router forwards a multicast message to a particular network segment only when there are multicast receivers on that network segment. When the last device in a network segment leaves a multicast group, the router "prunes" the multicast data stream associated with that group and stops forwarding the multicast stream to that segment. Therefore, network segments with no multicast group members do not have to transmit the multicast traffic. Using multicast, bandwidth is saved because only a single message is sent from the source device, and this message is only transmitted to devices that are members of the particular multicast group.

In order to send IP multicast packets, the source device specifies a destination address that represents the multicast group. This destination address may be referred to as a multicast group address, and is typically a Class D IP address. To receive multicast packets, an application on a device wanting to participate in a multicast group requests membership in the multicast group. This membership request is sent to the router on the requesting device's LAN, and, if necessary, the request is sent to intermediate routers in a WAN coupling the requesting device and the other devices in the multicast group.

When a multicast message is sent from a source device on another LAN, WAN routers deliver the requested incoming multicast packets to each participating device's LAN router. The LAN router, which has mapped the multicast group address to its associated hardware (e.g., data link layer) address, builds the LAN message (e.g., an Ethernet frame) using the multicast group address. The participating enable a telecommunication session between telephony devices (e.g., a conference call). Using a conference call as an example, instead of each telephony device transmitting unicast streaming to each of the other telephony devices participating in the conference call, each telephony device can multicast its media streaming to the multicast group address. Each of the participating telephony devices can then receive the streaming from other participating telephony devices at the multicast address. Each telephony device then mixes or sums the media streaming received from each of the other telephony devices to form a conference-like input (this may be referred to as a client summing multicast conference call). Other uses of multicast include transmitting "music on hold" or other media to telephony devices that have been placed on hold, and transmitting media streaming to a telephony device so that the telephony device can monitor a telecommunication session between other telephony devices.

As described above, using multicast streaming in these applications reduces the total network bandwidth required for the particular application. However, not all telephony devices that might participate in the conference call or other application support multicast communication. Examples of such unicast telephony devices may include gateways, computers running unicast telephony software (e.g., MICROSOFT NETMEETING), and unicast IP telephones.

Standing alone, unicast telephony devices are not able to participate in a multicast telecommunication session because unicast telephony devices are not capable of monitoring a multicast group address to determine if any messages are being sent to the multicast group. Multicast telephony devices, on the other hand, can monitor a multicast group address to receive multicast messages, as well as monitoring their own network address to receive unicast and broadcast messages. Since unicast telephony devices do not monitor multicast group addresses, if unicast telephony devices are to be directly included in a telecommunication session, then all of the telephony devices must communicate using unicast (and incur the disadvantages of using this method of communication).

However, if a multicast intermediary is inserted into a telecommunication session on behalf of the unicast telephony device(s), the unicast telephony device(s) can effectively participate in a multicast telecommunication session. Using a multicast intermediary, the multicast telephony devices and the multicast intermediary are able to communicate using multicast, and the multicast intermediary operates to forward the multicast media streaming to and receive media streaming from the unicast telephony device using unicast. In this manner, multicast telephony devices are able to take advantage of the multicast feature, while still being able to communicate with the unicast telephony devices.

Figure 4:
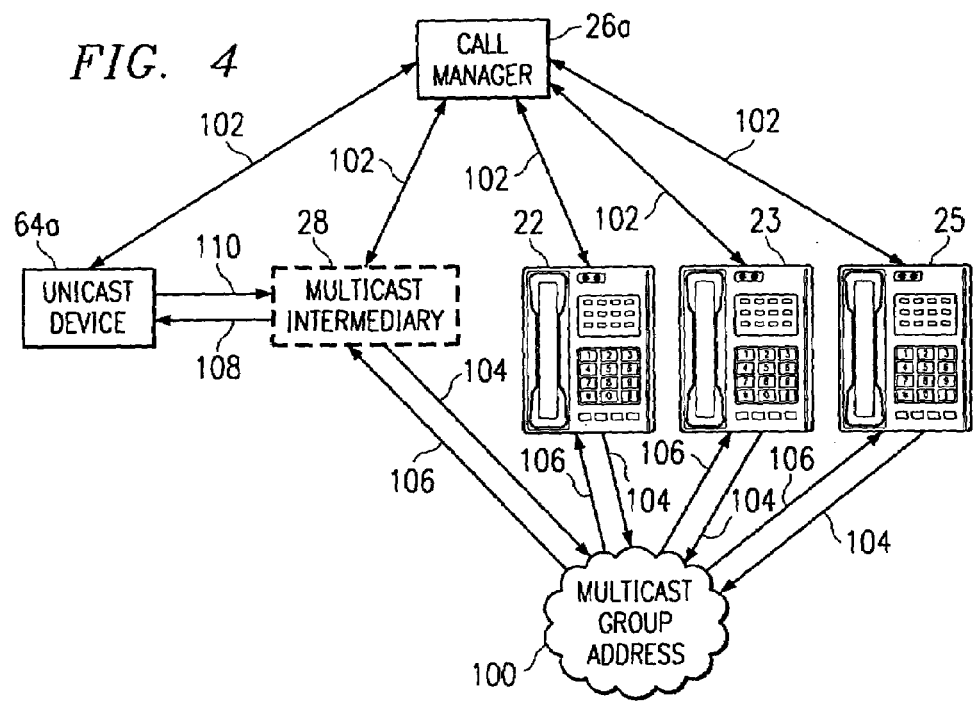
FIG. 4 illustrates a communication link established between multicast telephony devices and a unicast telephony device using a multicast intermediary.

FIG. 4 illustrates a communication link established between multicast telephony devices 22, 23, 25 and a unicast telephony device 64*a* using a multicast intermediary 28. The communication link includes a signaling link between telephony devices 22, 23, 25, 64*a* and call manager 26*a*, and a media streaming link between the telephony devices via a multicast group address 100 and/or multicast intermediary 28. Multicast group address 100 represents a router and/or telephony device functionality to establish and execute multicast communications, as described above. The communication link is initiated when the telephony device initiating the telecommunication session sends a call initiation request to call manager 26*a*. For example, telephony device 64*a* (a gateway) may send a call initiation request using TCP signaling 102 (or any other appropriate type of signaling) to call manager 26*a* indicating that PSTN telephony device 68*a* requests a telecommunication session (e.g., a conference call) with telephony devices 22, 23 and 25. In response to this call initiation request, call manager 26*a* signals telephony devices 22, 23 and 25 using TCP signaling 102 to indicate the requested telecommunication session. If telephony devices 22, 23 and 25 can participate in the telecommunication session, call manager 26*a* initiates the telecommunication session between the telephony devices as follows.

From registration information previously sent by telephony devices 22, 23 and 25 to call manager 26*a*, call manager 26*a* determines that telephony devices 22, 23 and 25 support multicast communication. Therefore, call manager 26*a* establishes a multicast group having a multicast group address 100. Call manager 26*a* instructs telephony devices 22, 23 and 25 to initiate outgoing media streaming 104 to multicast address 100, and to monitor multicast address 100 for incoming media streaming 106. In this manner, a multicast telecommunication session is established between telephony devices 22, 23 and 25.

In addition, call manager 26*a* determines from either registration information or the call initiation request that telephony device 64*a* is a unicast telephony device. Therefore, call manager 26*a* determines that a multicast intermediary is needed and generates multicast intermediary 28. Call manager also associates a logical port of multicast intermediary 28 with each of telephony device 64*a* and multicast address 100. As with telephony devices 22, 23 and 25, call manager 26*a* instructs multicast intermediary 28 to monitor multicast address 100 for incoming media streaming 106. In addition, call manager 26*a* signals telephony device 64*a* to initiate outgoing media streaming 110 to the logical port of multicast intermediary 28 that call manager 26*a* associated with multicast address 100.

As described above, multicast intermediary 28 performs an address translation on media streaming it receives from either multicast address 100 or telephony device 64*a* using an address translation module. When multicast intermediary 28 receives incoming media streaming 110 from telephony device 64*a*, it notes the source address in the incoming packets, modifies the source address to the logical port of multicast intermediary 28 that is associated with telephony device 64*a*, and forwards the packets as media streaming 104 to multicast address 100 using a communication module.

Likewise, multicast intermediary 28 forwards media streaming 108 that it receives from multicast address 100 to telephony device 64*a* as media streaming 108 using the communication module (after modifying the source address of the incoming packets to the logical port of multicast intermediary 28 that is associated with multicast address 100). However, before media streaming 108 is forwarded, multicast intermediary will typically sort or mix media streaming 104 received from telephony devices 22, 23 and 25. Since telephony device 64*a* is not multicast-capable, it is not able to determine the original source of the packets included in media streaming 108 (telephony device 64*a* believes all packets originated at multicast intermediary 28), and thus telephony device 64*a* cannot properly sort and sequence the incoming data. Therefore, multicast intermediary can either mix media streaming 104 received from telephony devices 22, 23, and 25, sort media streaming 104 and indicate to telephony device 64*a* that the individual streams have different origins (e.g., by indicating different logical ports of multicast intermediary 28 in the source address of the packets), or it can choose a single media stream 104 from one of telephony device 22, 23, and 25 and forward it to telephony device 64*a*. Multicast intermediary may also perform any other type of processing to convert media streaming 106 received from multicast group address 100 into a format appropriate for a unicast telephony device.

Through the use of multicast intermediary 28, telephony device 64*a* may participate in a multicast telecommunication session in which it would not otherwise be capable of participating. Although telephony device 64*a* is not directly capable of sending and receiving multicast messages, and thus network bandwidth is not saved with respect to telephony device 64*a*, the other telephony devices 22, 23, 25 participating in the telecommunication session are able to use multicasting to conserve network bandwidth. If multicast intermediary 28 was not present in the telecommunication session, then telephony devices 22, 23, 25 would have to communicate using unicast in order to allow telephony device 64*a* to participate, and the bandwidth savings of multicast could not be realized.

Figure 5:
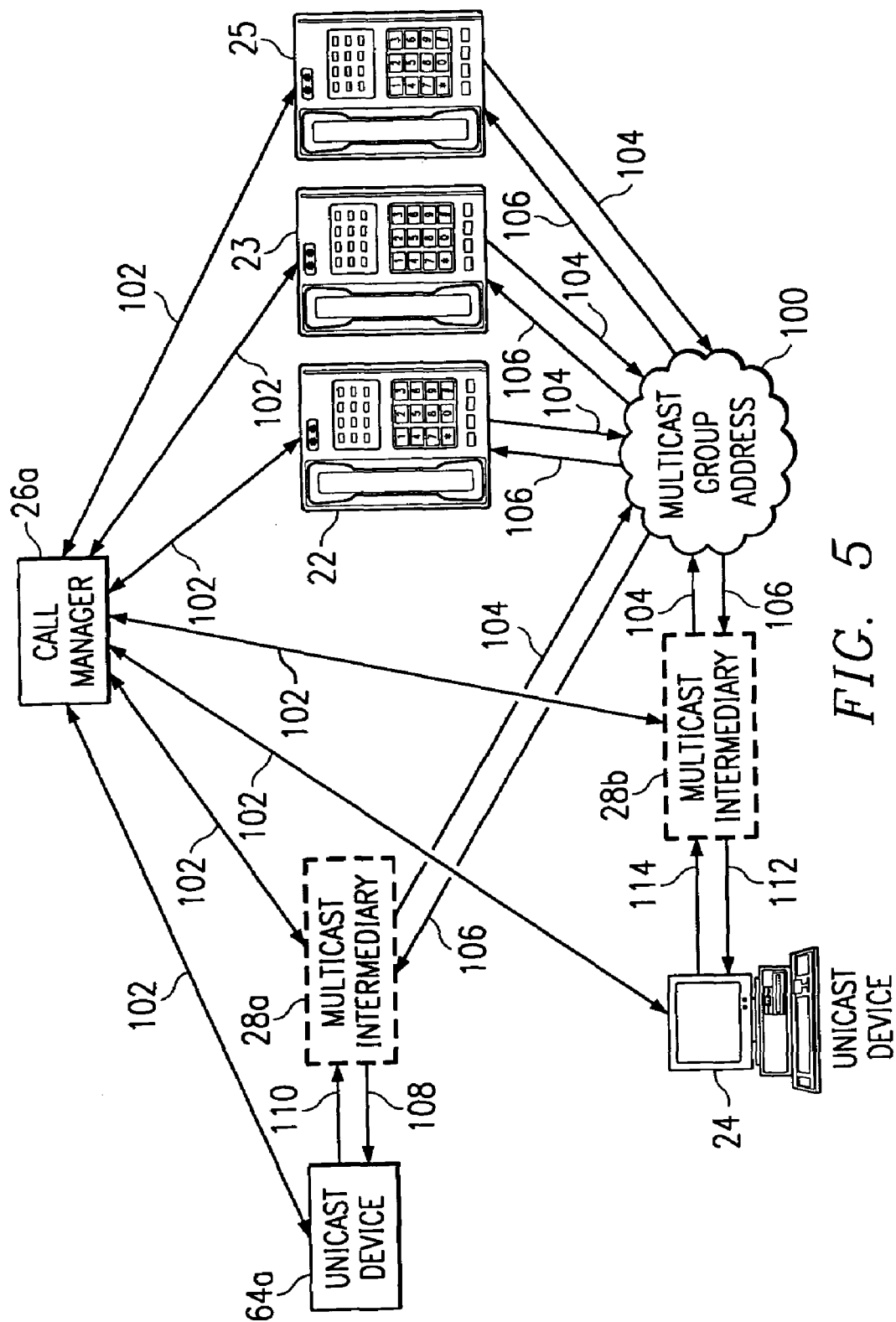
FIG. 5 illustrates a communication link established between a plurality of multicast telephony devices and a plurality of unicast telephony devices using a plurality of multicast intermediaries.

FIG. 5 illustrates a communication link established between telephony devices 22, 23, 25 and two unicast telephony devices 64*a* and 24 (a computer running unicast telephony software, such as MICROSOFT NETMEETING). When there are two or more unicast telephony devices, a multicast intermediary may be generated for each unicast telephony device in order to forward multicast streaming from multicast group address 100 to the unicast telephony device with which it is associated, as described above. In FIG. 5, for example, multicast intermediary 28*a* forwards multicast streaming 106 to telephony device 64*a* (after any appropriate mixing or sorting), and multicast intermediary 28*b* forwards multicast streaming 106 to telephony device 24 (after any appropriate mixing or sorting). Likewise, multicast intermediary 28*a* forwards unicast streaming 110 sent from telephony device 64*a* to multicast group address 100, and multicast intermediary 28*b* forwards unicast streaming 114 from telephony device 24 to multicast group address 100.

Figure 6:
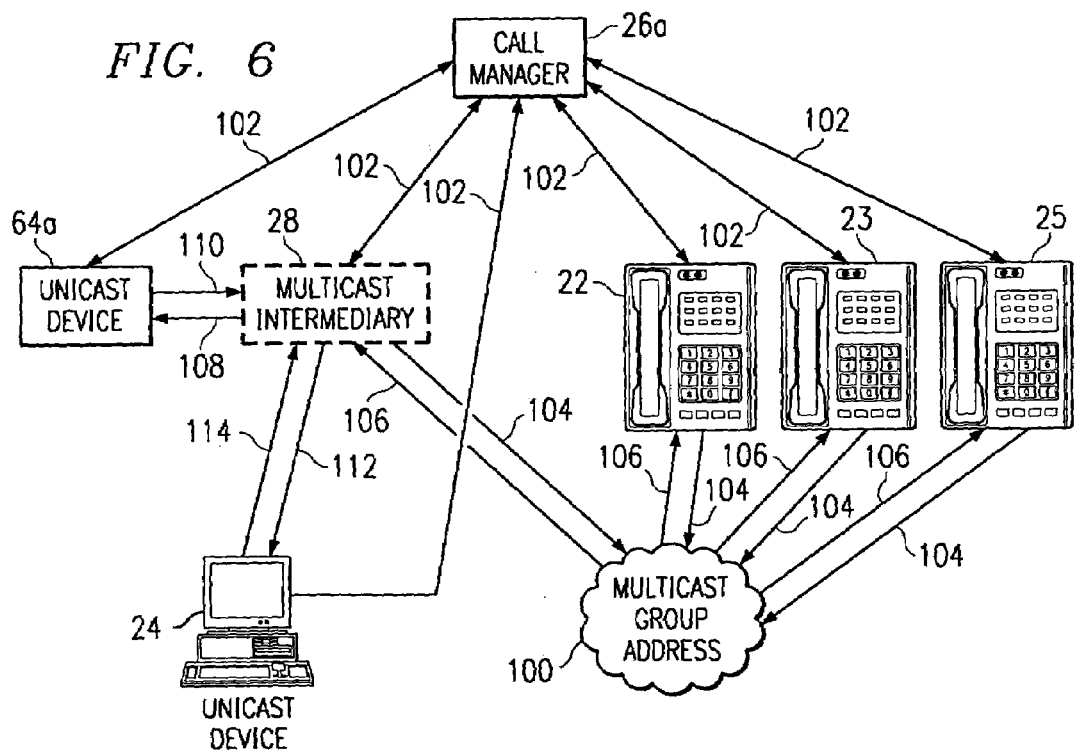
FIG. 6 illustrates a communication link established between a plurality of multicast telephony devices and a plurality of unicast telephony devices using a single multicast intermediary.

FIG. 6 illustrates an alternate configuration of the communication link of FIG. 5. In this configuration, a single multicast intermediary 28 forwards multicast streaming 106 from multicast group address 100 to unicast telephony devices 24 and 64*a*. Telephony devices 24 and 64*a* are each associated with a different logical port of multicast intermediary 28, and multicast intermediary 28 transmits streaming 106 received from multicast address 100 to each of these logical ports as described above. Likewise, multicast intermediary 28 forwards unicast streaming 110, 114 from telephony devices 64*a* and 24, respectively, to multicast group address 100.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for enabling a multicast telecommunication session, comprising:

receiving a call initiation request indicating a desire to create a communication link between a multicast telephony device and a unicast telephony device;

determining that the unicast telephony device is incapable of receiving multicast media streaming;

generating a virtual multicast intermediary in response to determining that the unicast telephony device is incapable of receiving multicast media streaming;

receiving multicast media streaming sent to a multicast group address from a plurality of multicast telephony devices at the virtual multicast intermediary;

sorting, at the virtual multicast intermediary, the multicast media streaming sent to the multicast group address from the plurality of multicast telephony devices into individual streams based on the telephony devices that originated each stream;

communicating, from the virtual multicast intermediary, the sorted media streaming to a unicast telephony device to enable the unicast telephony device to participate in a multicast telecommunication session; and indicating to the unicast telephony device that the individual media streams of the sorted media streaming originated from different multicast telephony devices.

2. The method of claim 1, further comprising:
receiving unicast media streaming from the unicast telephony device at the multicast intermediary; and
communicating the media streaming to the multicast group address.

3. The method of claim 1, further comprising:
associating a first logical port of the multicast intermediary with the unicast telephony device;
receiving multicast media streaming from the multicast group address at the first logical port;
modifying source address information in the received multicast media streaming to specify a second logical port of the multicast intermediary associated with the multicast group address; and
communicating the media streaming with the modified source address information to the unicast telephony device.

4. The method of claim 3, wherein associating a second logical port of the multicast intermediary with the unicast telephony device comprises associating a User Datagram Protocol (UDP) logical port to enable the streaming of Internet Protocol (IP) packets.

5. The method of claim 4, wherein modifying source address information in the received media streaming comprises modifying a source IP address and port information in a header of an IP packet.

6. The method of claim 1, wherein receiving multicast media streaming sent to a multicast group address comprises receiving multicast media streaming from one or more multicast telephony devices participating in a conference call with the unicast device.

7. The method of claim 1, wherein indicating to the unicast telephony device that the individual media streams originated from different telephony devices comprises indicating a different logical port of the multicast intermediary as the source address of packets comprising each of the individual media streams.

8. The method of claim 1, wherein receiving multicast media streaming sent to a multicast group address comprises receiving multicast media directed to the unicast telephony device when the unicast telephony device is placed on hold.

9. A communication network, comprising:
a unicast telephony device;
a plurality of multicast telephony devices operable to receive multicast media streaming transmitted to a multicast group address;
a call manager operable to:
receive a call initiation request indicating a desire to create a communication link between a multicast telephony device and a unicast telephony device;
determine that the unicast telephony device is incapable of receiving multicast media streaming;
a virtual multicast intermediary operable to:
receive multicast media streaming sent to the multicast group address from the plurality of multicast telephony devices;
sort the multicast media streaming transmitted to the multicast group address into individual streams based on the telephony devices that originated each stream;
communicate the sorted media streaming to the unicast telephony device to enable the unicast telephony device to participate in the multicast communication with the multicast telephony devices; and
indicate to the unicast telephony device that the individual media streams of the sorted media streaming originated from different multicast telephony devices;
wherein the virtual multicast intermediary is generated in response to a determination that the unicast telephony device is incapable of receiving multicast media streaming.

10. The communication network of claim 9, wherein the multicast intermediary is further operable to receive unicast media streaming from the unicast telephony device and to communicate the media streaming to the multicast group address.

11. The communication network of claim 9, wherein the multicast intermediary comprises a logical device implemented using software executed on one or more devices coupled to the communication network.

12. The communication network of claim 9, wherein the unicast telephony device and the multicast telephony devices comprise Internet Protocol (IP) telephony devices.

13. The communication network of claim 9, wherein the multicast media streaming comprises Real-Time Transport Protocol (RTP) media streaming.

14. The communication network of claim 9, wherein the multicast media streaming comprises media transmitted in a conference call between the unicast telephony device and the multicast telephony devices.

15. The communication network of claim 9, wherein the virtual multicast intermediary is further operable to indicate a different logical port of the multicast intermediary as the source address of packets comprising each of the individual media streams.

16. The communication network of claim 9, wherein the multicast media streaming comprises multicast media streaming transmitted to the unicast telephony device when the unicast telephony device is placed on hold.

17. A communication network, comprising:
a first unicast telephony device;
a second unicast telephony device;
a plurality of multicast telephony devices operable to receive multicast media streaming transmitted to a multicast group address;
a call manager operable to:
receive a call initiation request indicating a desire to create a communication link between a multicast telephony device and a unicast telephony device;
determine that the unicast telephony device is incapable of receiving multicast media streaming;
a first virtual multicast intermediary operable to:
receive multicast media streaming sent to the multicast group address from the plurality of multicast telephony devices;
sort the multicast media streaming transmitted to the multicast group address into individual streams based on the telephony devices that originated each stream;
communicate the sorted media streaming to the first unicast telephony device to enable the unicast telephony device to participate in the multicast communication with the multicast telephony devices; and
indicate to the first unicast telephony device that the individual media streams of the sorted media streaming originated from different telephony devices; and a second virtual multicast intermediary operable to:
receive multicast media streaming sent to the multicast group address from the plurality of multicast telephony devices;
sort the multicast media streaming transmitted to the multicast group address into individual streams based on the telephony devices that originated each stream;
communicate the sorted media streaming to the second unicast telephony device to enable the unicast telephony device to participate in the multicast communication with the multicast telephony devices; and
indicate to the second unicast telephony device that the individual media streams of the sorted media streaming originated from different multicast telephony devices; and
wherein the first and second virtual multicast intermediaries are generated in response to a determination that the first and second unicast telephony devices are incapable of receiving multicast media streaming.

18. The communication network of claim 17, wherein:
the first multicast intermediary is further operable to receive unicast media streaming from the first unicast telephony device and to communicate the media streaming to the multicast group address; and
the second multicast intermediary is further operable to receive unicast media streaming from the second unicast telephony device and to communicate the media streaming to the multicast group address.

19. The communication network of claim 17, wherein the first and second multicast intermediaries each comprise a logical device implemented using software executed on one or more devices coupled to the communication network.

20. The communication network of claim 17, wherein the first and second unicast telephony devices and the multicast telephony devices comprise Internet Protocol (IP) telephony devices.

21. The communication network of 17, wherein the multicast media streaming comprises Real-Time Transport Protocol (RTP) media streaming.

22. The communication network of claim 17, wherein the multicast media streaming comprises media transmitted in a conference call between the first and second unicast telephony devices and the plurality of multicast telephony devices.

23. The communication network of claim 17, wherein the first and second virtual multicast intermediaries are each further operable to indicate a different logical port of the first and second multicast intermediaries as the source address of packets comprising each of the individual media streams.

24. The communication network of claim 17, wherein the multicast media streaming comprises multicast media streaming transmitted to at least one of the first and second unicast telephony devices when at least one of the first and second unicast telephony devices is placed on hold.

25. Virtual multicast intermediary software embodied in a computer-readable medium and operable to perform the following steps:
receiving a call initiation request indicating a desire to create a communication link between a multicast telephony device and a unicast telephony device;
determining that the unicast telephony device is incapable of receiving multicast media streaming;
receiving multicast media streaming sent to a multicast group address from a plurality of multicast telephony devices; and
sort the multicast media streaming transmitted to the multicast group address into individual streams based on the telephony devices that originated each stream;
communicating the sorted media streaming to a unicast telephony device to enable the unicast telephony device to participate in a multicast telecommunication session; and
indicate to the unicast telephony device that the individual media streams of the sorted media streaming originated from different multicast telephony devices;
the virtual multicast intermediary software executable in response to a determination that the unicast telephony device is incapable of receiving multicast media streaming.

26. The multicast intermediary software of claim 25, further operable to perform the following steps:
receiving unicast media streaming from the unicast telephony device; and
communicating the media streaming to the multicast group address.

27. The multicast intermediary software of claim 25, further operable to perform the following steps:
associating a first logical port with the unicast telephony device;
receiving multicast media streaming from the multicast group address at the first logical port;
modifying source address information in the received multicast media streaming to specify a second logical port associated with the multicast group address; and
communicating the media streaming with the modified source address information to the unicast telephony device.

28. The multicast intermediary software of claim 27, wherein associating a first logical port with the unicast telephony device comprises associating a User Datagram Protocol (UDP) logical port to enable the streaming of Internet Protocol (IP) packets.

29. The multicast intermediary software of claim 28, wherein modifying source address information in the received media streaming comprises modifying a source IP address and port information in a header of an IP packet.

30. The multicast intermediary software of claim 25, wherein receiving multicast media streaming sent to a multicast group address comprises receiving multicast media streaming from one or more multicast telephony devices participating in a conference call with the unicast device.

31. The multicast intermediary software of claim 25, wherein receiving multicast media streaming sent to a multicast group address comprises receiving multicast media directed to the unicast telephony device when the unicast telephony device is placed on hold.

32. The virtual multicast intermediary software of claim 25, wherein the software is further operable to perform the step of indicating a different logical port of the multicast intermediary as the source address of packets comprising each of the individual media streams.

33. A communication network, comprising:
a plurality of multicast telephony devices operable to receive multicast media streaming transmitted to a multicast group address;
a call manager operable to:
receive a call initiation request indicating a desire to create a communication link between a multicast telephony device and a unicast telephony device;
determine that the unicast telephony device is incapable of receiving multicast media streaming; and establish a communication session with one or more of the multicast telephony devices; and a virtual multicast intermediary operable to:
  receive multicast media streaming transmitted to the multicast group address from the plurality of multicast telephony devices;
  sort the multicast media streaming transmitted to the multicast group address into individual streams based on the telephony devices that originated each stream;
  communicate the sorted media streaming to a unicast telephony device to enable the unicast telephony device to participate in a multicast communication with the multicast telephony devices; and
  indicate to the unicast telephony device that the individual media streams of the sorted media streaming originated from different multicast telephony devices;
  wherein the virtual multicast intermediary is generated in response to a determination that the unicast telephony device is incapable of receiving multicast media streaming.

34. The communication network of claim 33, wherein the call manager is further operable to establish a communication session between the multicast telephony devices, such that each multicast telephony device receives and sums multicast media streaming from the other multicast telephony devices.

35. The communication network of claim 33, wherein the call manager is further operable to transmit multicast media streaming to a multicast telephony device when the multicast telephony device is placed on hold.

36. A virtual multicast intermediary comprising a communication module operable to:
  receive multicast media streaming from a multicast group address from a plurality of multicast telephony devices;
  sort the multicast media streaming into individual streams based on the telephony devices that originated each stream;
  communicate the sorted media streaming to a unicast telephony device to enable the unicast telephony device to participate in the multicast communication with multicast telephony devices; and
  indicate to the unicast telephony device that the individual media streams of the sorted media streaming originated from different multicast telephony devices;
  wherein the virtual multicast intermediary is generated in response to a determination that the unicast telephony device is incapable of receiving multicast media streaming.

37. The multicast intermediary of claim 36, further comprising:
  a first logical port associated with the unicast telephony device;
  a second logical port associated with the multicast group address; and
  an address translation module operable to receive multicast media streaming from the multicast group address at the first logical port, and further operable to modify source address information in the received multicast media streaming to specify the second logical port associated with the multicast group address.

38. The multicast intermediary of claim 37, wherein the communication module is operable to communicate the media streaming with the modified source address information to the unicast telephony device.

39. The multicast intermediary of claim 37, wherein the first and second logical ports are User Datagram Protocol (UDP) logical ports.

40. The multicast intermediary of claim 37, wherein the address translation module is further operable to modify a source IP address and port information in a header of an IP packet.

41. The virtual multicast intermediary of claim 36, wherein the communication module is further operable to indicate a different logical port of the multicast intermediary as the source address of packets comprising each of the individual media streams.

* * * * *